US009896023B1

(12) United States Patent
Salter et al.

(10) Patent No.: US 9,896,023 B1
(45) Date of Patent: Feb. 20, 2018

(54) VEHICLE REAR LIGHTING ASSEMBLY

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/428,569

(22) Filed: Feb. 9, 2017

(51) Int. Cl.
| | |
|---|---|
| *B60Q 1/00* | (2006.01) |
| *B60Q 1/22* | (2006.01) |
| *F21S 8/10* | (2006.01) |
| *F21V 14/02* | (2006.01) |
| *F21V 7/00* | (2006.01) |
| *B60Q 1/30* | (2006.01) |

(52) U.S. Cl.
CPC ............ *B60Q 1/22* (2013.01); *F21S 48/2212* (2013.01); *F21S 48/2218* (2013.01); *F21S 48/23* (2013.01); *F21V 14/02* (2013.01); *B60Q 1/30* (2013.01); *F21S 48/232* (2013.01); *F21V 7/0083* (2013.01)

(58) Field of Classification Search
CPC .......... B60Q 1/30; F21V 7/0083; F21S 48/23; F21S 48/232
USPC ................ 362/487, 541, 543, 544, 546, 548
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,471,371 A | 11/1995 | Koppolu et al. |
| 5,709,453 A | 1/1998 | Krent et al. |
| 5,839,718 A | 11/1998 | Hase et al. |
| 5,877,682 A | 3/1999 | Groeller |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,550,949 B1 | 4/2003 | Bauer et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,840,660 B2 | 1/2005 | Hymer |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Thuy Vinh Tran
(74) *Attorney, Agent, or Firm* — Jason Rogers; Price Heneveld LLP

(57) ABSTRACT

A backup lamp is provided herein. The backup lamp includes a housing and a lens. A plurality of light sources is disposed in upper and lower positions of the housing. The plurality of light sources in the upper position are angularly offset from the plurality of light sources in the lower position. A plurality of reflectors surround each light source and have a focal axis that is offset from each of the remaining reflectors. A controller is configured to selectively illuminate the light sources in a plurality of illumination patterns.

18 Claims, 13 Drawing Sheets

(56) References Cited

U.S. PATENT DOCUMENTS

| | | | |
|---|---|---|---|
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,111,968 B2 * | 9/2006 | Bauer | B60Q 1/0023 340/425.5 |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,481,561 B2 * | 1/2009 | Okuda | B60Q 1/076 362/523 |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,893,865 B2 * | 2/2011 | Natsume | B60Q 1/0023 342/104 |
| 7,963,685 B2 | 6/2011 | Kowalczyk et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,447 B2 | 2/2012 | Simon et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,162,613 B2 | 10/2015 | Huang | |
| 9,187,034 B2 | 11/2015 | Tarahomi et al. | |
| 9,299,887 B2 | 3/2016 | Lowenthal et al. | |
| 9,349,926 B2 * | 5/2016 | Maeda | H01L 33/58 |
| 2002/0159741 A1 | 10/2002 | Graves et al. | |
| 2002/0163792 A1 | 11/2002 | Formosa | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2004/0246741 A1 | 12/2004 | You et al. | |
| 2005/0084229 A1 | 4/2005 | Babbitt et al. | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0251592 A1 | 9/2015 | Fisher | |
| 2015/0267881 A1 | 9/2015 | Salter et al. | |
| 2016/0016506 A1 | 1/2016 | Collins et al. | |
| 2016/0102819 A1 | 4/2016 | Misawa et al. | |
| 2016/0236613 A1 | 8/2016 | Trier | |
| 2017/0158125 A1 | 6/2017 | Schuett et al. | |

FOREIGN PATENT DOCUMENTS

| | | |
|---|---|---|
| CN | 201193011 Y | 2/2009 |
| CN | 103129451 A | 6/2013 |
| CN | 203115781 U | 8/2013 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE REAR LIGHTING ASSEMBLY

FIELD OF THE INVENTION

The present invention generally relates to vehicular lighting, and more particularly to vehicle lighting assemblies disposed on an exterior portion of the vehicle.

BACKGROUND OF THE INVENTION

Vehicular rear lighting assemblies are generally installed in a rear portion of a vehicle and are operable to indicate that a vehicle is braking, has its taillights on, has its hazard lights on, is backing up, or is turning.

SUMMARY OF THE INVENTION

According to one aspect of the present disclosure, a backup lamp is disclosed. The backup lamp includes a housing and a lens. A plurality of light sources is disposed in upper and lower positions of the housing. The plurality of light sources in the upper position are angularly offset from the plurality of light sources in the lower position. A plurality of reflectors surround each light source and have a focal axis that is offset from each of the remaining reflectors. A controller is configured to selectively illuminate the light sources in a plurality of illumination patterns.

According to another aspect of the present disclosure, a vehicle lamp is disclosed. The vehicle lamp includes a housing. A plurality of light sources is disposed within the housing and is configured to emit light through a lens. Each light source is operably coupled with an independent reflector that is angularly offset from the remaining reflectors. A controller is configured to selectively illuminate the light sources in a plurality of illumination patterns while a vehicle transmission is in a reverse position.

According to yet another aspect of the present disclosure, a vehicle lamp is disclosed. The vehicle lamp includes a housing and a lens. An upper row of light sources is disposed within the housing. A lower row of light sources is disposed below the upper row of light sources and is aimed downwardly of the upper row of light sources. A plurality of reflectors is angularly offset from one another and surround the upper and lower rows of light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
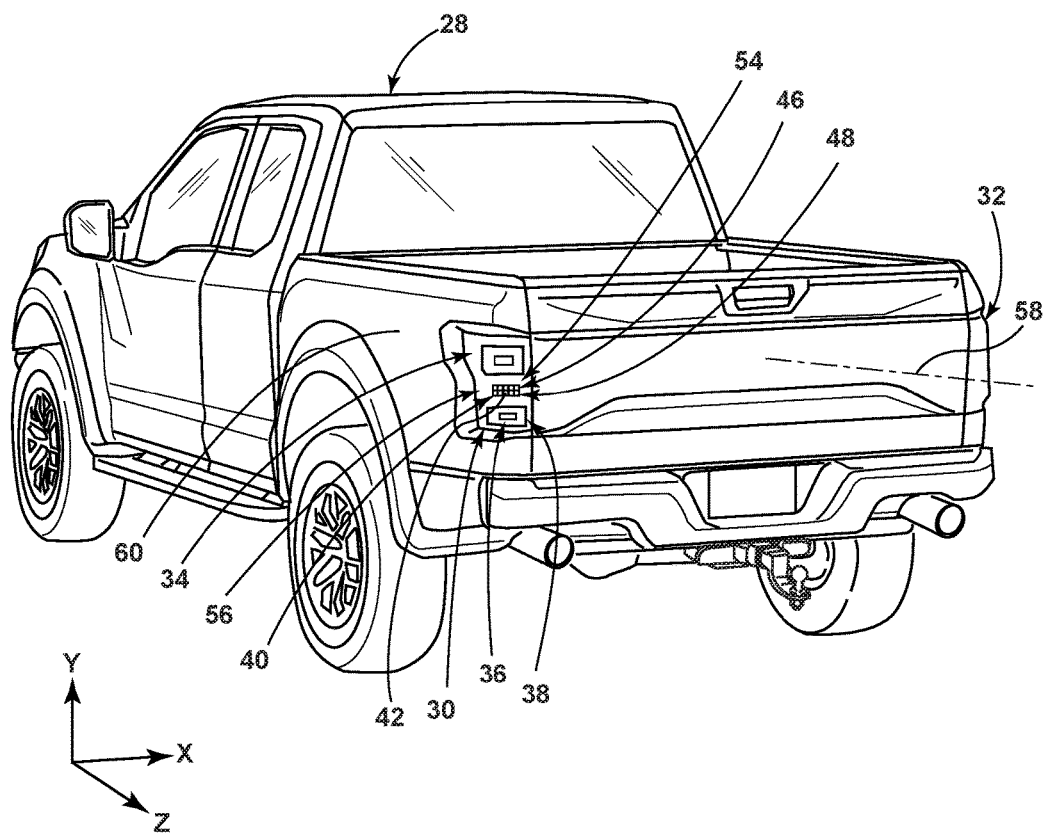
FIG. 2 is a rear perspective view of a vehicle containing one or more lamp assemblies, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lamp for a vehicle. In some embodiments, the lamp is configured as a backup lamp that alters an illumination pattern of the backup lamp based on a wide array of vehicle actions and/or conditions. The backup lamp may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
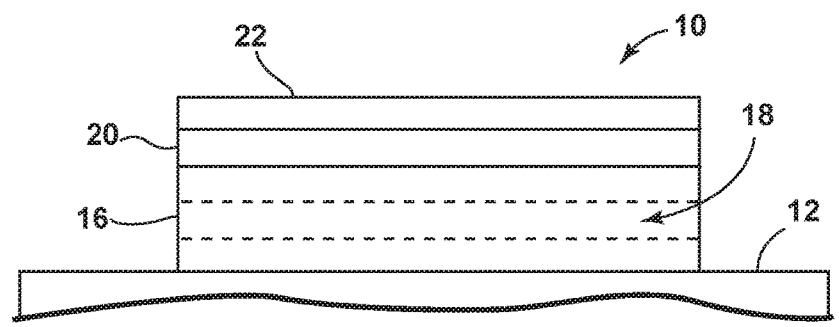
FIG. 1A is a side view of a luminescent structure rendered as a coating for use in a vehicle assembly according to various embodiments.
Figure 1B:
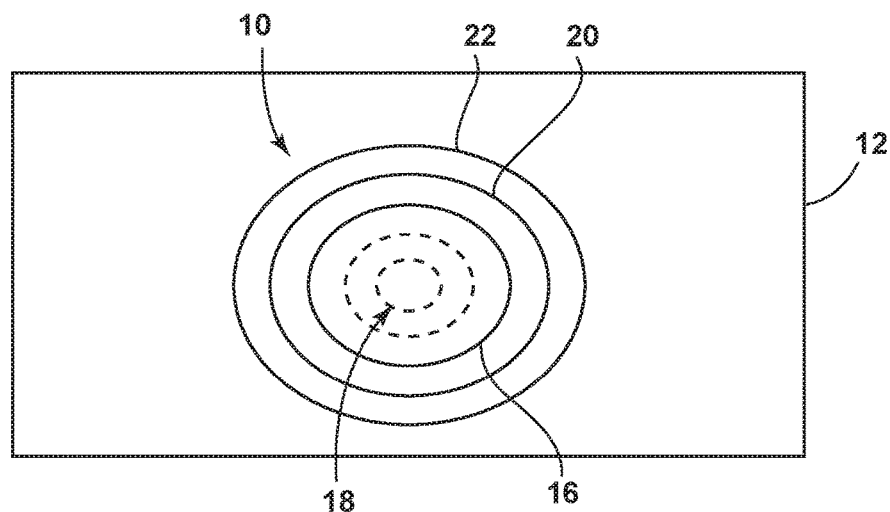
FIG. 1B is a top view of a luminescent structure rendered as a discrete particle according to various embodiments.
Figure 1C:
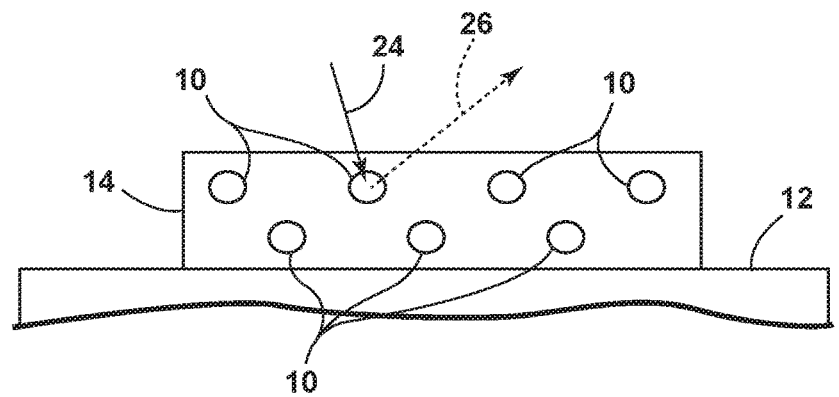
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 42 (FIG. 2) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No.

8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG: Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 42. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 42). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 42 that emit the excitation light 24, including, but not limited to, natural light sources (e.g., the sun) and/or any artificial light sources 42. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure Li2ZnGeO4 and may be prepared by a high temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, an automotive vehicle 28 has a light assembly 30 mounted on and/or integrated with a rear portion 32 of the vehicle 28. The light assembly 30 may be configured as a headlamp, a brake lamp 34, a running lamp 36, a turn indicator lamp 38, a backup lamp 40, any other lamp that may be disposed on the exterior and/or interior of the vehicle 28, and/or combinations thereof. The general shape and appearance light assembly 30 and lamps (e.g., 34, 36, 38, 40) provided therein is by way of example only, as the light assembly 30 may be configured in any practicable shape and include any number of lamps (e.g., 34, 36, 38, 40) therein that perform any function without departing from the scope of the present disclosure. It will be appreciated that the light assembly 30 may be located at other locations on the vehicle 28 and may be disposed on multiple locations of the vehicle 28 and function in conjunction with one another.

Referring still to FIG. 2, the backup lamp 40, and/or the light assembly 30, may include one or more light sources 42 therein. As will be described in greater detail below, each light source 42 includes a focal axis 44 (FIG. 3) that may be offset from the remaining light sources 42 such that the backup lamp 40 may illuminate in a wide range of directions and/or illumination patterns based on the light sources 42 illuminated.

Figure 2A:
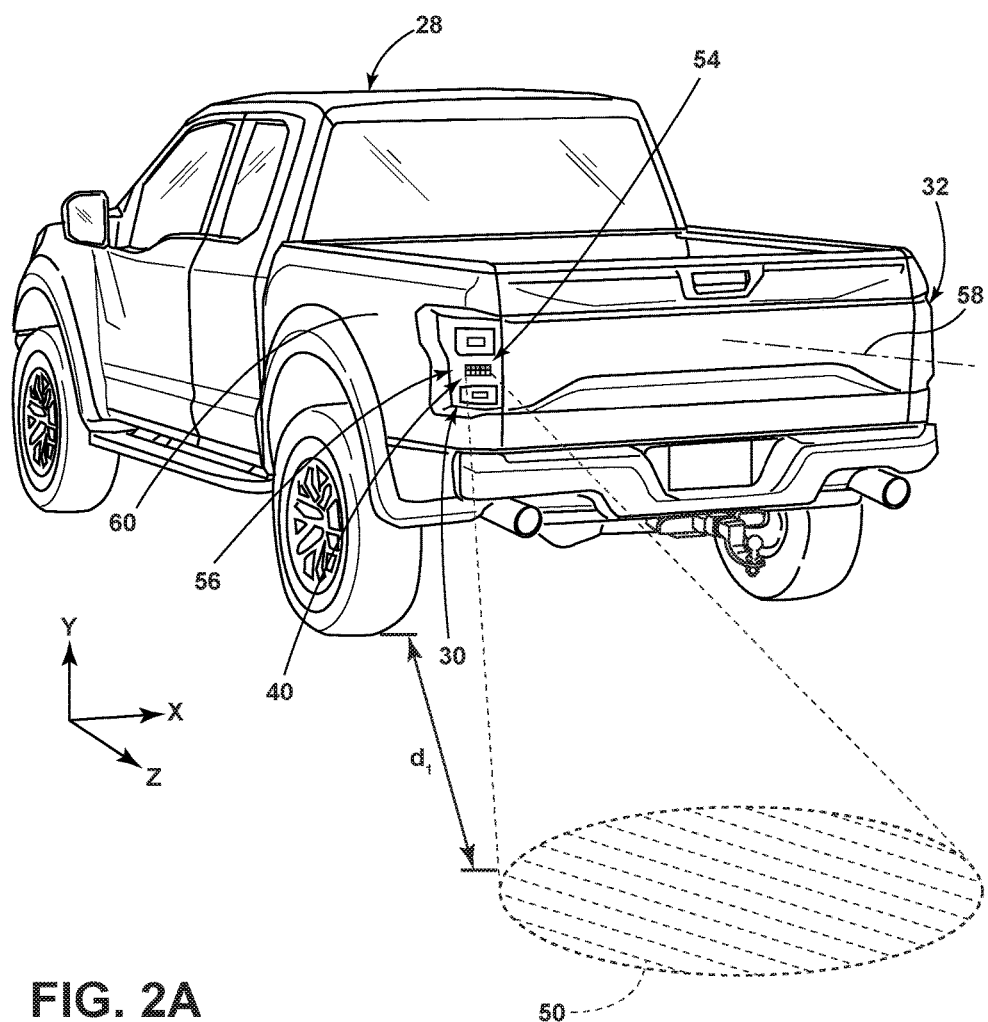
FIG. 2A is a rear perspective view of the vehicle having a first illumination pattern emitted from a backup lamp, according to various embodiments.
Figure 2B:
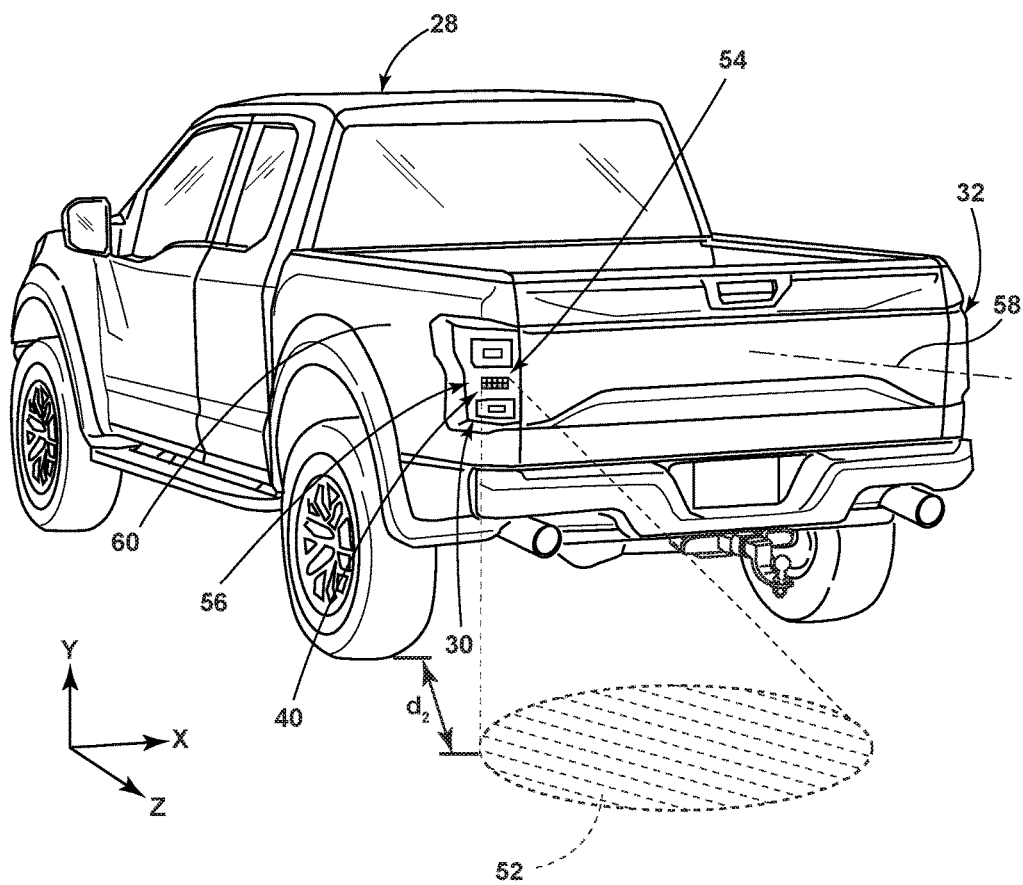
FIG. 2B is a rear perspective view of the vehicle having a second illumination pattern emitted from a backup lamp, according to various embodiments.

Referring to FIGS. 2-2B, the backup lamp 40 is illustrated, according to various embodiments, having an upper row 46, or upper position, and a lower row 48, or lower position, of light sources 42. As illustrated, each row 46, 48 includes five light sources 42 therein that are laterally arranged with one another. However, it will be appreciated that the backup lamp 40 may include any number (one or more) of rows 46, 48 of light sources 42. Furthermore, each row 46, 48 of light sources 42 may include any number (one or more) light sources 42 therein. Moreover, the light sources 42 provided within the backup lamp 40 may be oriented in any geometric shape and need not be disposed in rows 46, 48 and/or columns.

Figure 3:
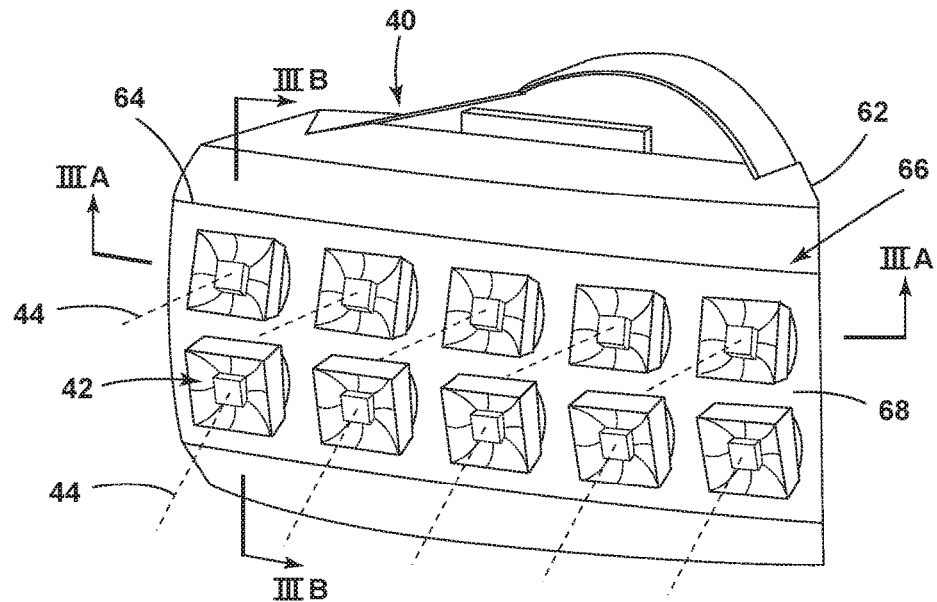
FIG. 3 is a front perspective view of the backup assembly having a plurality of light sources therein, according to various embodiments.
Figure 3A:
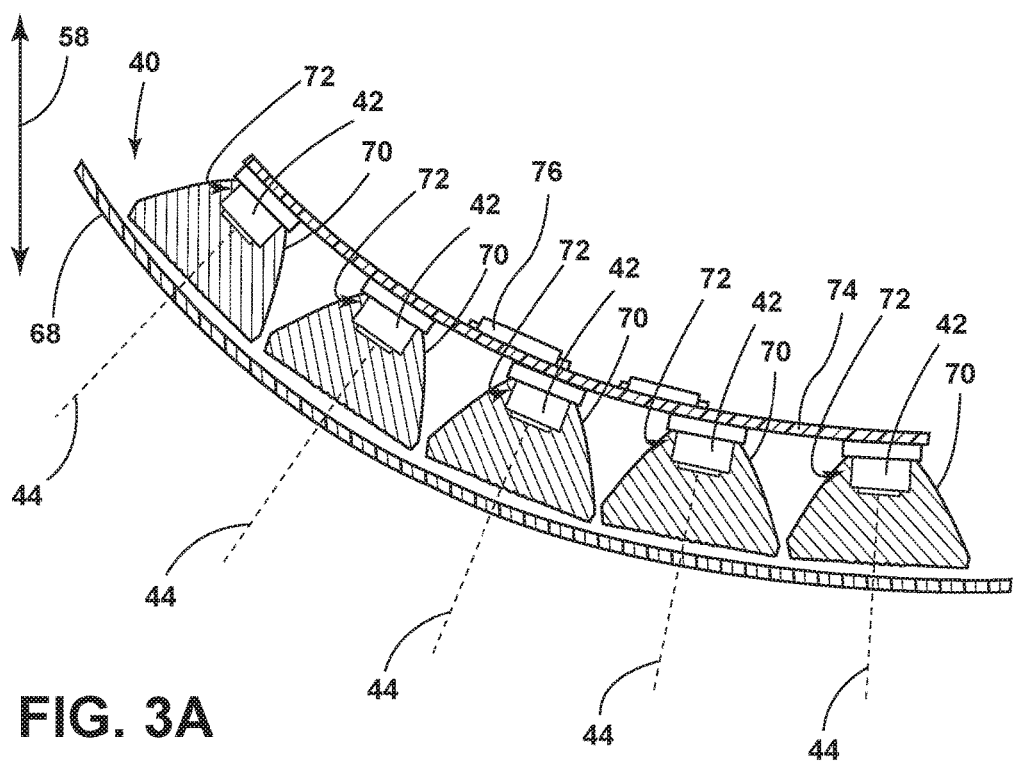
FIG. 3A is a cross-sectional view of the lamp of FIG. 3 taken along the line IIIA-IIIA.
Figure 3B:
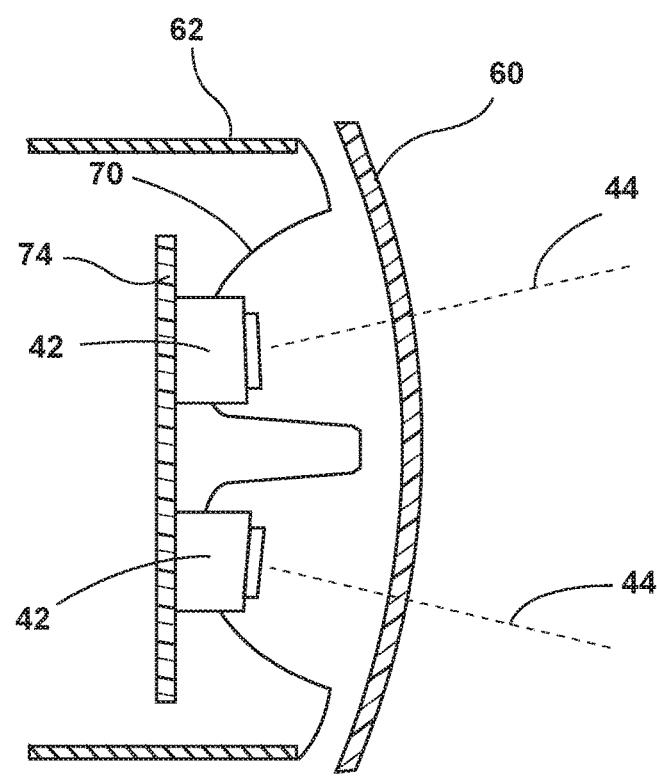
FIG. 3B is a cross-sectional view of the lamp of FIG. 3 taken along the line IIIB-IIIB.

As illustrated in FIGS. 2-3B, the lower row 48 of light sources 42 may have a focal axis 44 that is aimed at a downwardly position or angle from that of the upper row 46 of light sources 42. Accordingly, a first illumination pattern 50 (FIG. 2A) that is emitted from light sources 42 within the upper row 46 of light sources 42 may extend to a distance $d_1$ that is further from the vehicle 28 than an illumination pattern 52 (FIG. 2B) emitted from the lower row 48 of light sources 42 towards a second position that is a second distance $d_2$ from the vehicle 28. However, it will be appreciated that any row 46, 48 of light sources 42 may be configured to emit a longer illumination pattern. Accordingly, in various embodiments, the lower row 48 of light sources 42 may emit a longer illumination pattern while the upper row 46 emits a shorter illumination pattern. Moreover, the upper row 46 and lower row 48 of light sources 42 each include a plurality of light sources 42 that are arranged from an inboard position 54 to an outboard position 56. The inboardly-disposed light sources 42 may be those that are in closer proximity to a centerline 58 of the vehicle 28. Conversely, the outboardly-disposed light sources 42 may be disposed in closer proximity to a side panel 60 of the vehicle 28. It will be appreciated that the illumination patterns (e.g. 50, 52) described herein may form light cones, which may be described as a surface in space-time, represented as a cone in three dimensions, comprising the points from which a light signal would reach a given point (at the apex) simultaneously, and that therefore appear simultaneous to an observer at the apex. Moreover, the light cone may be of any geometry without departing from the scope of the present disclosure.

Referring to FIGS. 3-3B, the backup lamp 40 includes a housing 62, which may define a rectangular bezel 64 at a front side of the housing 62 through which excitation light output from the one or more light sources 42 may be transmitted through a transparent and/or translucent lens 68 covering the front side of the housing 62. The lens 68 may be fabricated from an optically transparent and/or translucent material, such as polycarbonate, glass, or other translucent materials with high optical quality and capable of being manufactured to tight tolerances. Optics may be arranged within light output windows of the corresponding light sources 42, respectively, such that excitation light 24 output by the light sources 42 is directed towards a desired location. It will be understood, however, that the bezel 64, the lens 68, and/or any other component of the backup lamp 40 may be in any geometric shape without departing from the teachings provided herein.

The one or more light sources 42 may be configured to emit visible and/or non-visible light, such as blue light, UV light, infrared light, and/or violet light and may include any form of light source 42. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light assembly 30. Further, various types of LEDs are suitable for use as the light sources 42 including, but not limited, to top-emitting LEDs, side-emitting LEDs, and others. Excitation light generated by the one or more light sources 42 passes generally through the lens 68 of the housing 62 to the outside environment when one or more light sources 42 is illuminated.

The light assembly 30 may further include one or more reflectors 70, such as a parabolic reflector 70, generally operably coupled with each light source 42. The one or more reflectors 70 may be formed from a polymeric material or any other suitable material known in the art. Each light source 42 may be surrounded by an independent reflector 70 that, like the light sources 42, is focally offset from the remaining reflectors 70 such that a wide variety of light patterns may be generated. It should be appreciated that the reflector 70 may be one or more separate components disposed within the housing 62.

The reflectors 70 may be formed integrally, as depicted, and each may include an aperture 72 aligned with the corresponding light source 42. The reflectors 70 are utilized for reflecting and redirecting incidental light rays from the light sources 42 for focusing the illumination in a targeted direction. The reflectors 70 and corresponding light sources 42 are oriented to convey light rearwardly, laterally outboard, and above/below the backup lamp 40 for illuminating an expanded illumination pattern and for conveying a turn direction of the vehicle 28 to viewers in various directions with respect to the vehicle 28. The light sources 42 can also be controlled and operated separately for providing clearance illumination rearward of the vehicle 28, which may provide assistance in trailering and towing operations.

The backup lamp 40 may include a printed circuit board (PCB) 74 containing a controller 76 including control circuitry including LED drive circuitry for controlling activation and deactivation of the light sources 42. The PCB 74 may be any type of circuit board including, but not limited to, any flexible PCB and/or rigid PCB. According to various embodiments, the PCB 74 may have a cross-sectional shape that is substantially similar to that of the lens 68.

Figure 4:
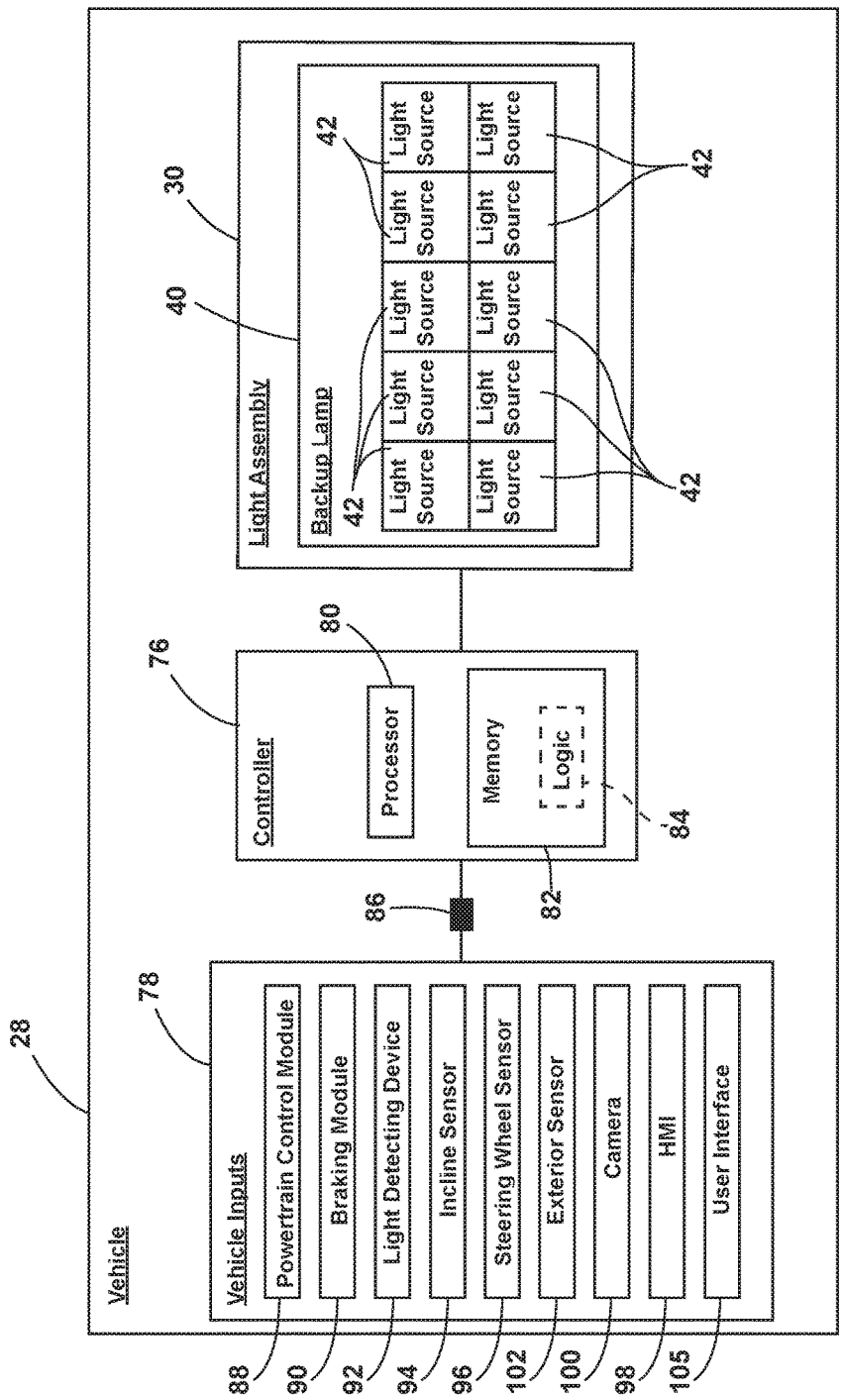
FIG. 4 is a box diagram of the lamp, according to various embodiments.

Referring to FIG. 4, the backup lamp 40 is further illustrated having the controller 76 receiving various inputs 78 and controlling each of the light sources 42, by applying signals to the light sources 42. The controller 76 may include a processor 80 and memory 82 as illustrated, according to various embodiments. It should be appreciated that the controller 76 may include control circuitry such as analog and/or digital control circuitry. Stored within memory 82 and executed by the processor 80 is logic 84 for processing the various inputs 78 and controlling each of the light sources 42.

One or more vehicle inputs 78 may communicate with the backup lamp 40 through a multiplex communication bus 86. The multiplex communication bus 86 may be disposed within the backup lamp 40, the light assembly 30, and/or the vehicle 28. According to various embodiments, the various inputs 78 include, but are not limited to, a powertrain control module 88, a braking module 90, a light-detecting device 92, an incline sensor 94, a steering wheel position sensor 96, a human-machine interface (HMI) 98, a camera 100, and/or one or more exterior sensors 102 disposed on the vehicle 28.

Figure 5A:
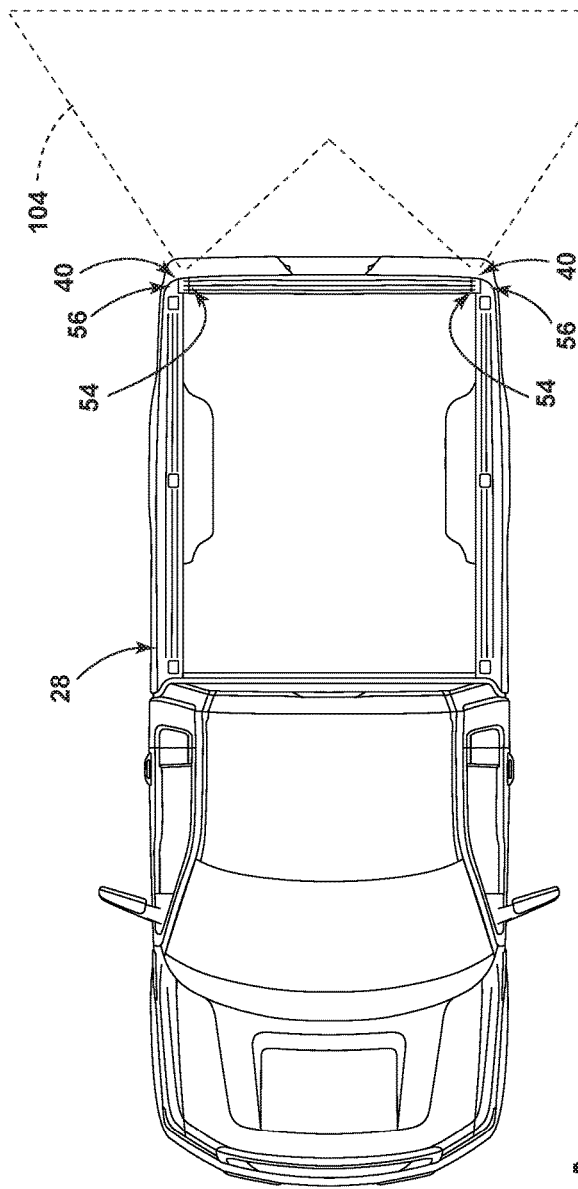
FIG. 5A is a top plan view of the vehicle emitting the first illumination pattern from a first portion of light sources within the lamp, according to various embodiments.
Figure 5B:
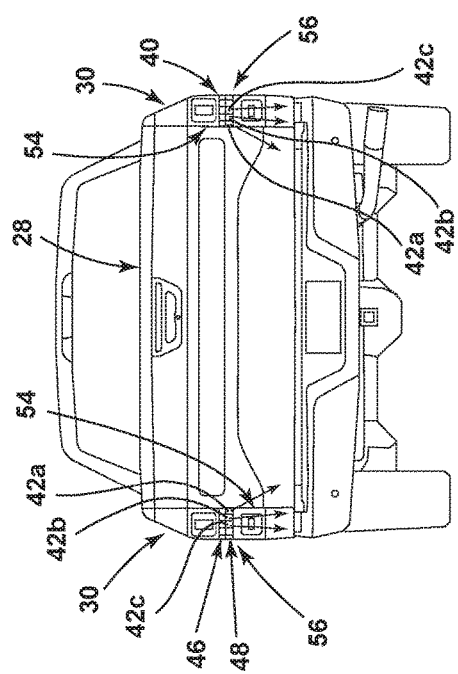
FIG. 5B is a rear plan view of the vehicle emitting the first illumination pattern from the first portion of light sources within the lamp, according to various embodiments.

The powertrain control module 88 may be utilized for determining the direction of movement of the vehicle 28 and/or transmission status of the vehicle 28. For example, the powertrain control module 88 may provide the controller with information relating to the ability of the vehicle 28 to move in a rearward direction. In response, the controller 76 may illuminate a predefined first illumination pattern 104 (FIG. 5A) at a neutral intensity. The first illumination pattern 104 and neutral intensity may be similar to that of a single light source 42 backup lamp 40, as known by one of ordinary skill in the art.

The braking module 90 may monitor the speed of the vehicle 28. However, it will be appreciated that any other device and/or sensor within the vehicle 28 may additionally and/or alternatively be utilized for determining the speed of the vehicle without departing from the scope of the present disclosure. According to various embodiments, the controller 76 may increase or decrease the intensity of light emitted from the one or more light sources 42 depending on the speed of the vehicle 28, when the vehicle 28 is traveling in a rearwardly direction. For example, when the vehicle 28 is traveling below a predefined speed (e.g., three miles per hour (mph)), a first intensity of light may be emitted from one or more of the light sources 42. Conversely, when the vehicle 28 is traveling above the predefined speed, a second, higher intensity of light may be emitted from the one or more light sources 42. The controller 76 may modify the intensity of the emitted first and second wavelengths of excitation light 24 by pulse-width modulation or current control. According to various embodiments, the intensity of light emitted from the light sources 42 may be increased to five times the original intensity.

The light-detecting device 92 may be integrated into the vehicle 28, the light assembly 30, and/or the backup lamp 40. The light-detecting device 92 senses the environmental lighting conditions, such as whether the vehicle 28 is in day-like conditions (i.e., higher light level conditions) and/or whether the vehicle 28 is in night-like conditions (i.e., lower light level conditions). The light-detecting device 92 can be of any suitable type, and can detect the day-like and night-like conditions in any suitable fashion. For instance, in various embodiments, the light-detecting device 92 includes a light sensor that detects the amount of light (e.g., solar radiation) affecting the vehicle 28 for determining whether day-like or night-like conditions exist. According to various embodiments, a lower initial intensity of excitation light 24 may be emitted by the light source 42 when the light-detecting device 92 senses night-like conditions. A higher initial intensity of excitation light 24 may be emitted when the light-detecting device 92 senses day-like conditions.

Referring still to FIG. 4, the vehicle 28 may further include the incline sensor 94 to provide a tilt or incline signal to the controller 76. Any appropriate incline sensor 94, such as an accelerometer that can measure accelerations due to gravity along an axis, may be chosen as the incline sensor 94. The incline sensor 94 may be mounted so that it is sensitive along the Y-axis (FIG. 2) and is perpendicular to the force of gravity. Due to this relationship, when the vehicle 28 is on a flat surface, the output of the accelerometer is 0 G. For example, using the incline sensor 94, when the vehicle 28 is tilted around the X-axis (FIG. 2), and in a direction along the −Y-axis, the output varies in a known way from 0 G to −1.00 G, depending on the degree of tilt (−1.00 G corresponding to −90 degrees relative to the Y-axis). Correspondingly, when the vehicle 28 is tilted around the X-axis in the direction opposite the first direction, the output varies from 0 G to +1.00 G, depending on the degree of tilt (+1.00 G corresponding to 90 degrees relative to the Y-axis). Additionally, the particular exemplary accelerometer may additionally be aligned to produce an output representative of incline relative to the Y-axis of the vehicle 28 (in addition to an X-axis output), if desired. The features of the above-named accelerometer will be used herein as an example, but this is not meant to be limiting, as other accelerometers and/or incline sensors 94 may be used without departing from the scope of the present disclosure. Further, two or more separate incline sensors 94 may be used to detect incline relative to other axes, if desired.

The steering wheel position sensor 96 may be any type of sensor known in the art and may monitor the rotational change of the steering wheel. According to various embodiments, as the steering wheel is rotated in one direction, the light sources 42 within the backup lamp 40 corresponding to the same side of the vehicle 28 may progressively illuminate from an inboard first portion of light sources 42 to a second portion of light sources 42 outboard of the first portion.

The exterior sensor(s) 102 can include mechanisms and/or sensors, such as RADAR, LIDAR, sonar, etc., that can be deployed to measure a distance between the vehicle 28 and other vehicles, persons and/or objects. Additionally, and/or alternatively, imaging sensors (e.g., cameras 100) may be disposed around the exterior of the vehicle 28 and determine approaching persons and/or objects. If a person and/or object are detected, the controller 76 may illuminate the light sources 42 that are directed towards the person and/or object to provide a notification to the driver of the vehicle 28 and the person the vehicle 28 is approaching about the approaching vehicle 28.

In operation, the light sources 42 may be activated using a variety of means. For example, the vehicle 28 may include a user interface 105. In some instances, the user interface 105 may be part of the HMI 98 disposed within the vehicle 28, or the user interface 105 may work in conjunction with the HMI 98. The user interface 105 may be configured such that a user may control the wavelength of excitation light 24 that is emitted by the light source 42 and/or the illumination pattern emitted from the backup lamp 40. Additionally, or alternatively, the user interface 105 may be used to switch the light assembly 30 through a plurality of modes and/or functions. The user interface 105 may use any type of control known in the art for controlling the light source 42, such as, but not limited to, switches (e.g., proximity sensors, push-type buttons) and may be disposed in any practicable location.

Figure 6A:
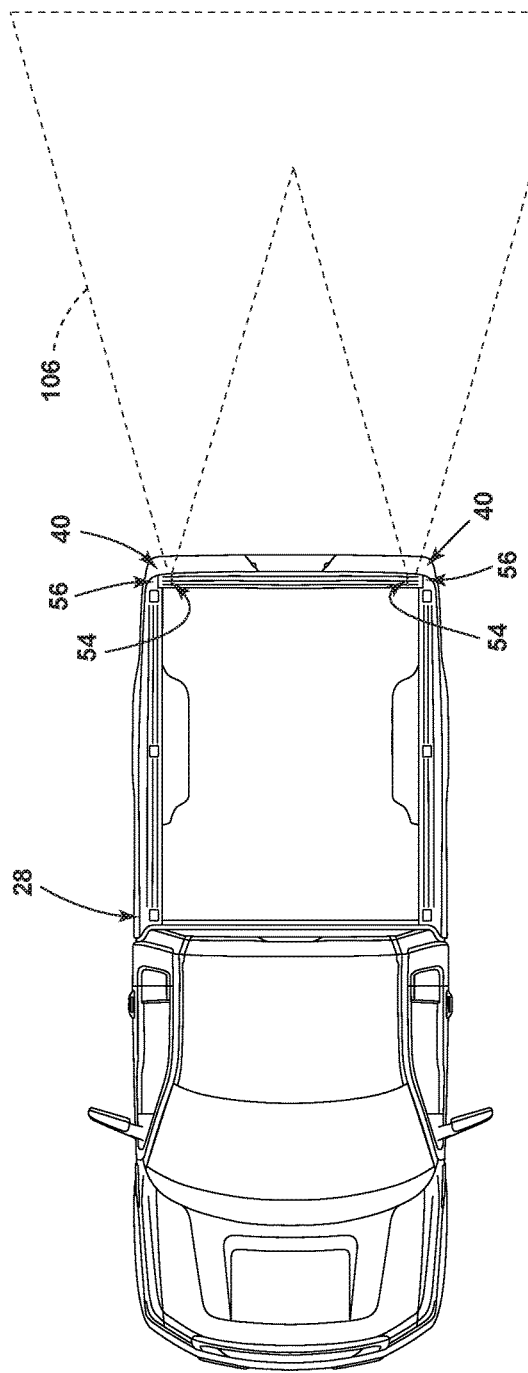
FIG. 6A is a top plan view of the vehicle emitting the second illumination pattern from a second portion of light sources within the lamp, according to various embodiments.
Figure 6B:
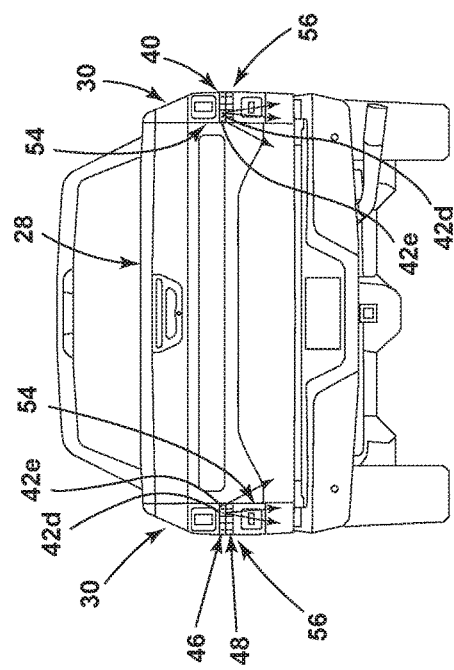
FIG. 6B is a rear plan view of the vehicle emitting the second illumination pattern from the second portion of light sources within the lamp, according to various embodiments.

Referring to FIGS. 5A-6B, a first illumination pattern 104 (FIG. 5A) may be emitted from the backup lamps 40 of the vehicle 28 when the vehicle 28 is moved rearwardly below or at a predefined speed. Conversely, a second illumination pattern 106 (FIG. 6A) may be emitted from the backup lamps 40 when the vehicle 28 is moved rearwardly above or at a predefined speed. To illuminate the first illumination pattern 104, the light sources 42 disposed in the lower portion, or lower row 48, of the backup lamp 40 may be utilized. To illuminate the second illumination pattern 106, the light sources 42 in the upper portion, or upper row 46, of the backup lamp 40 may be utilized. Additionally, less light sources 42 may be illuminated at a higher intensity to create the second illumination pattern 106 than the first illumination pattern 104. For example, as illustrated in FIG. 5B, the first illumination pattern 104 may be created by illuminating three inboardly-disposed light sources 42a, 42b, 42c of each backup lamp 40. As illustrated in FIG. 6B, the second illumination pattern 106 may be created by illumination of two inboardly-disposed light sources 42d, 42e within the upper row 46 of the backup lamp 40.

Figure 7:
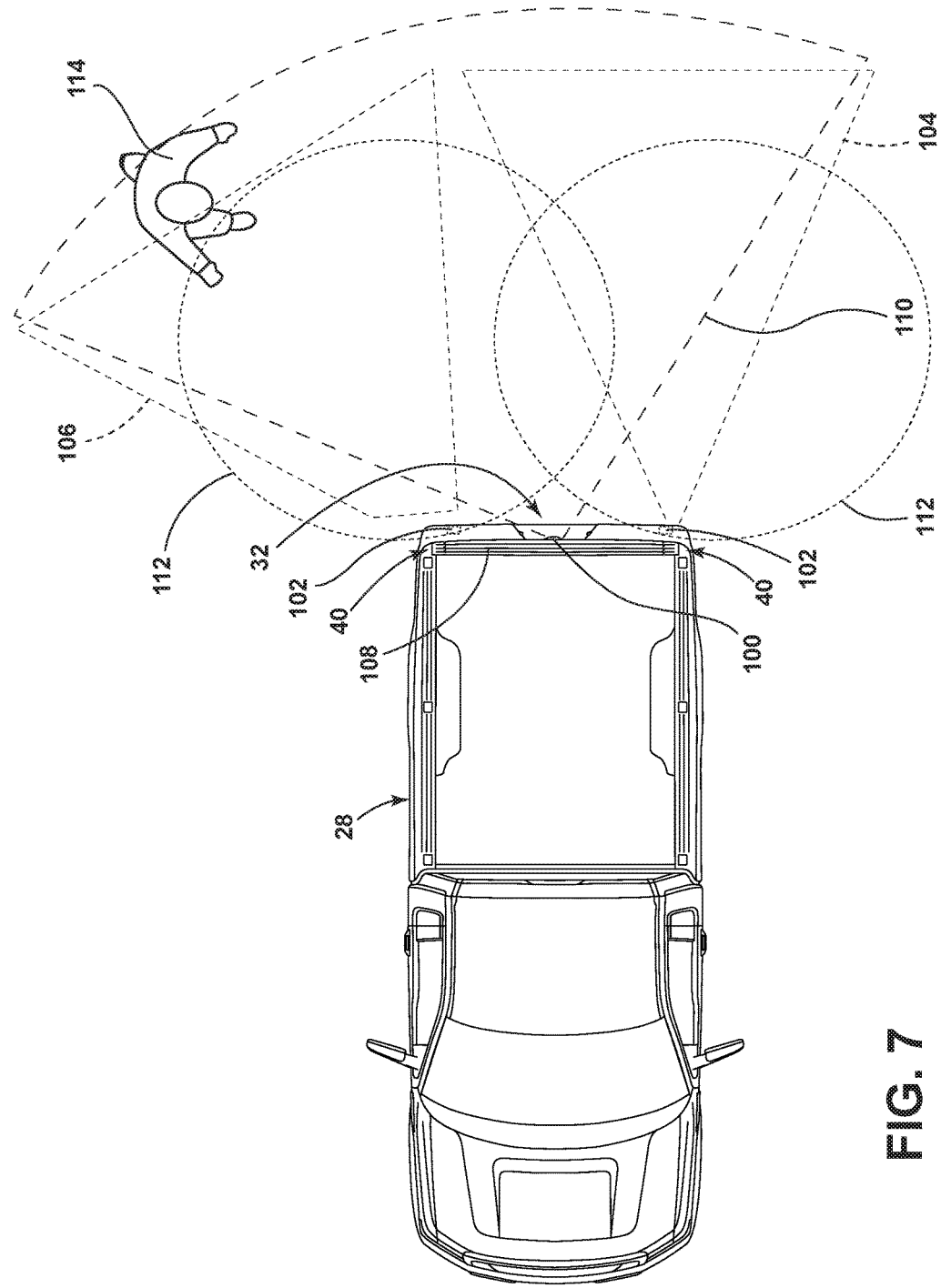
FIG. 7 is a top plan view of the vehicle emitting a third illumination pattern based on an object detected in close proximity to the vehicle, according to various embodiments.

Referring to FIG. 7, the vehicle 28 may include both the exterior sensor 102 and the camera 100, or any other vision-based device. The camera 100 includes an image sensor having an area type image sensor such as a CCD or a CMOS image sensor and image-capturing optics (not shown), and captures an image of an imaging field of view 110 defined by the image-capturing optics. The camera 100 may be located proximate an upper region of the vehicle tailgate 108 at the rear portion 32 of the vehicle 28. The illustrated camera 100 has an imaging field of view 110 located and oriented to capture one or more images rearwardly of the vehicle 28. The images may be analyzed to determine if the vehicle 28 is approaching an object and/or person. Likewise, the one or more exterior sensors 102 may generate a detection field 112. The camera 100 and/or one or more exterior sensors 102 may be utilized for determining the presence of an object and/or person 114. If an object and/or person 114 is detected, the backup lamp 40 may direct light towards the object and/or person 114 to alert the driver of the vehicle 28 and the person 114 rearward of the vehicle 28 of the approaching vehicle 28 thereby switching from a first illumination pattern 104 to a second illumination pattern 106.

Figure 8:
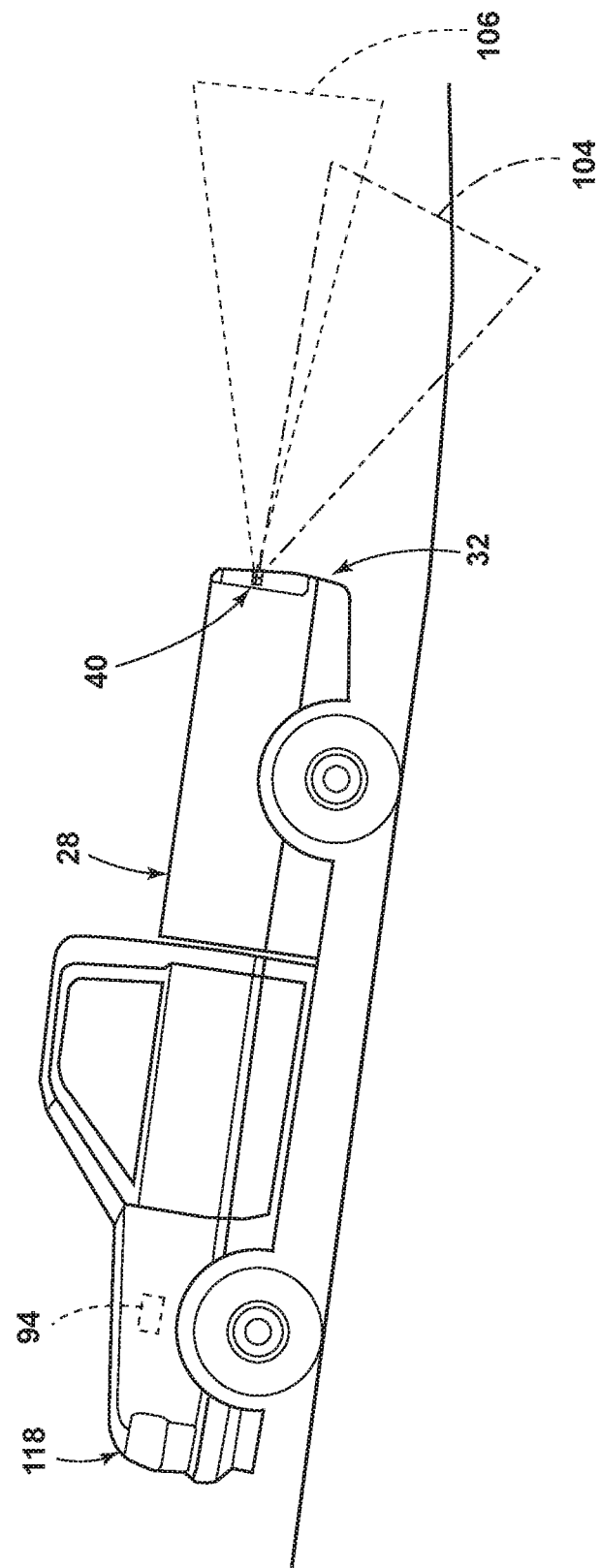
FIG. 8 is a side plan view of the vehicle disposed on an inclined surface emitting the first and second illumination patterns.

Referring to FIG. 8, as described above, the vehicle 28 may include the incline sensor 94. If the incline sensor 94 detects that the vehicle 28 is orientated such that a front portion 118 of the vehicle 28 is above the rear portion 32 of the vehicle 28, the backup lamp 40 may illuminate an illumination pattern 106 directed upwardly of the first illumination pattern 104 (FIG. 5A) to provide additional illumination to the driver of the vehicle 28. Conversely, if the front portion 118 is determined to be disposed below the rear portion 32, signaling that the vehicle 28 is on a downward slope, the first illumination pattern 104 may be emitted from the backup lamp 40. Moreover, if the vehicle 28 is carrying cargo that lowers the rear portion 32 of the vehicle 28, the backup lamp 40 may illuminate an illumination pattern directed upwardly of the first illumination pattern 104 (FIG. 5A) to provide additional illumination to the driver of the vehicle 28.

Figure 9:
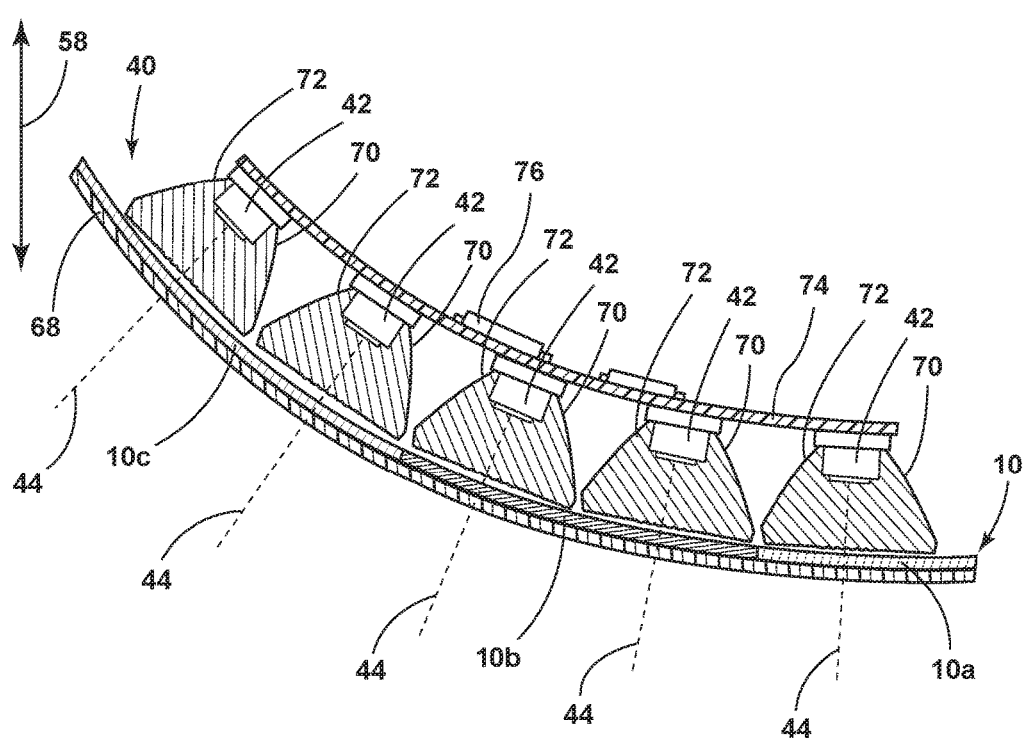
FIG. 9 is a cross-sectional view of the lamp of FIG. 3 taken along the line IIIA-IIIA having the luminescent structure on a lens of the lamp, according to various embodiments.
Figure 10:
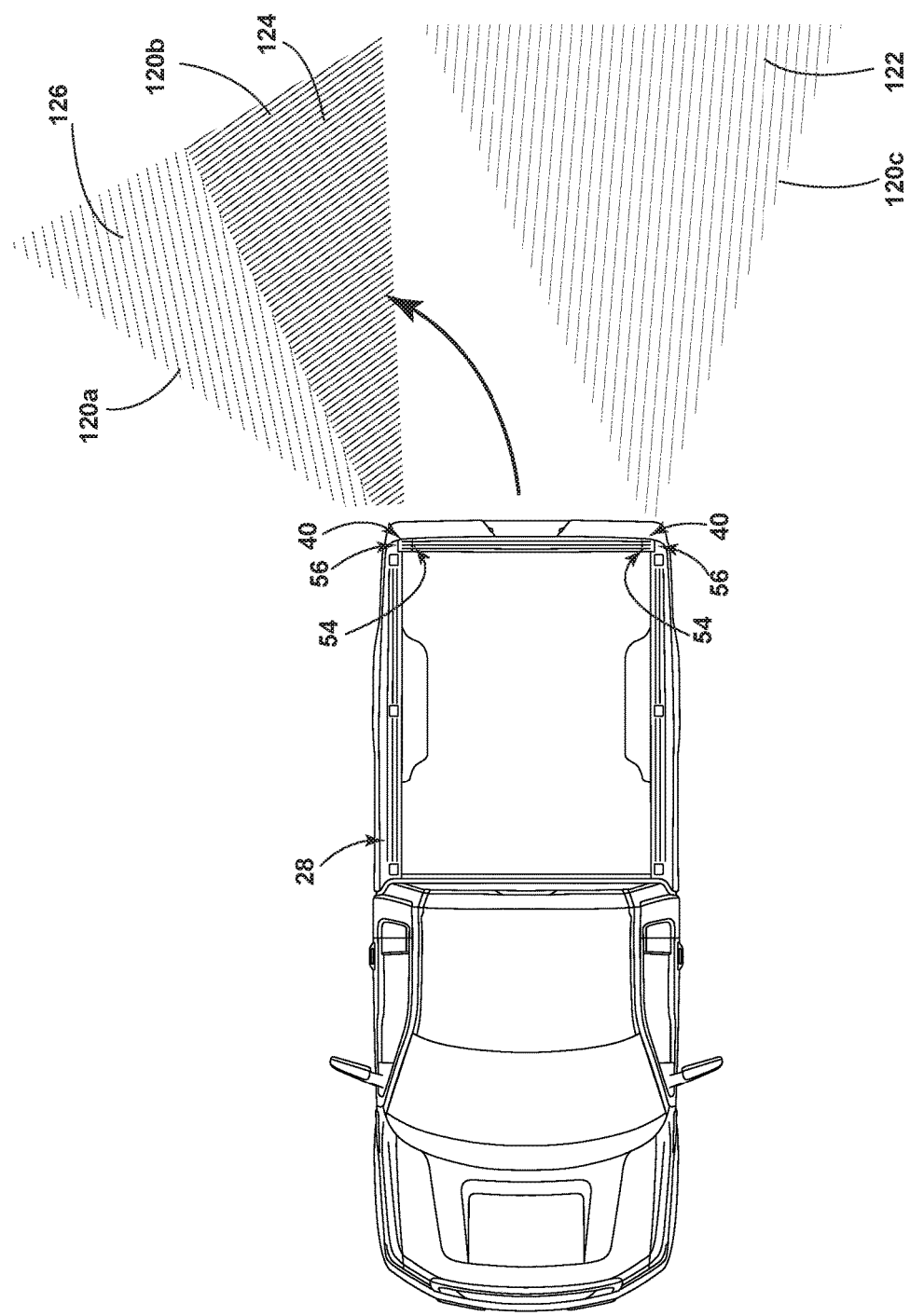
FIG. 10 is a top plan view of the vehicle having an illumination pattern emitted from the lamp in a plurality of wavelengths, according to various embodiments.

Referring to FIGS. 9 and 10, the luminescent structure 10 may be disposed between the light source 42 and the lens 68. In operation, the luminescent structure 10 may include a plurality of luminescent materials 18 therein that luminesce in response to receiving light of a specific wavelength. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues.

According to various embodiments, first, second, and third luminescent structures 10a, 10b, 10c may be disposed on various portions of the lens 68. Accordingly, as the corresponding light sources 42 emit excitation light 24 towards the first, second, and third luminescent structures 10a, 10b, 10c, various wavelengths 120a, 120b, 120c of converted light 26 are emitted from the backup lamp 40 thereby forming a wide array of illumination patterns 122, 124, 126. The various illumination patterns 122, 124, 126 may allow a driver of the vehicle 28 to see an object within a color pattern of the converted light 26 and utilize this information to determine the lateral distance between the object and the vehicle 28. The illumination patterns 122, 124, 126 may also alert a person 114 disposed proximate the vehicle 28 of the vehicle's 28 impending rearward motion. Additionally, and/or alternatively, the converted light 26 may change from a first wavelength 120a to a second wavelength 120b and/or a first illumination pattern 124 to a second illumination pattern 126 as the vehicle 28 continues to approach a person 114 and/or object to provide additional notification to the person 114 and/or the driver of the vehicle 28.

A variety of advantages may be derived from the use of the present disclosure. For example, use of the backup lamp disclosed herein provides information to persons disposed proximately the vehicle of the state of the vehicle. Moreover, the backup lamp disclosed herein provides a driver of the vehicle with additional illumination while performing a wide array of actions. The backup lamp may be manufactured at low costs when compared to standard vehicle lighting assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and 8 combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle backup lamp, comprising:
   upper position light sources angularly offset from lower position light sources, the upper and lower position light sources disposed within a housing;
   reflectors surrounding the upper and lower position light sources and having a focal axis offset from each remaining reflector; and
   a controller configured to selectively illuminate the lower position light sources when a vehicle is below a predefined speed with the upper position light sources illuminated.

2. The backup lamp of claim 1, wherein the upper and lower position light sources are arranged in rows.

3. The backup lamp of claim 2, wherein the lens has a curved outer surface and the upper and lower position light sources disposed within each row are arranged along the curved outer surface.

4. The backup lamp of claim 1, wherein the controller is configured to set a predefined speed and a first illumination pattern is emitted from the upper and lower position light sources when a vehicle is below the predefined speed and a second illumination pattern is emitted from the upper and lower position light sources when the vehicle is above the predefined speed, wherein the second illumination pattern extends further from a rearward position of the vehicle than the first illumination pattern.

5. The backup lamp of claim 4, wherein the second illumination pattern is emitted from the upper and lower position light sources at a higher intensity than the first illumination pattern.

6. The backup lamp of claim 1, further comprising:
   a luminescent structure operably coupled with the upper or lower position light sources and configured to luminesce in response to receiving excitation light from the upper or lower position light sources.

7. A vehicle lamp, comprising:
   a plurality of light sources disposed within a housing and configured to emit light through a lens;
   a plurality of reflectors, wherein each of the plurality of light sources is operably coupled with an independent reflector that is angularly offset from the remaining reflectors; and
   a controller configured to selectively illuminate a first illumination pattern when a vehicle is below a predefined speed and a second illumination pattern when the vehicle is above the predefined speed, the second illumination pattern extending further rearward than the first illumination pattern.

8. The vehicle lamp of claim 7, wherein the plurality of light sources includes a first light source disposed above a second light source, the second light source aimed downwardly of the first light source.

9. The vehicle lamp of claim 7, wherein the plurality of light sources includes a pair of light sources aligned laterally adjacent to one another.

10. The vehicle lamp of claim 9, wherein the pair of light sources is angularly offset from one another in relation to a vehicle centerline.

11. The vehicle lamp of claim 7, further comprising:
    a vehicle exterior sensor configured to detect an object disposed rearwardly of a vehicle, wherein the plurality of light sources direct light at the detected object if the object is determined to be within a backing path of the vehicle.

12. The vehicle lamp of claim 7, further comprising:
a luminescent structure operably coupled with the plurality of light sources and configured to luminesce in response to receiving excitation light from the light source.

13. The vehicle lamp of claim 12, wherein outboard portions of the lens include a first luminescent material and inboard portions of the lens include a second luminescent material, the first and second luminescent materials configured to emit varied wavelengths of converted light.

14. A vehicle lamp, comprising:
a housing and a lens;
lower row light sources disposed below upper row light sources and aimed downwardly of the upper row light sources;
a plurality of reflectors angularly offset from one another surrounding the upper and lower light sources; and
an incline sensor, wherein the upper and lower row light sources are selectively illuminated when a vehicle is disposed on an incline surface.

15. The vehicle lamp of claim 14, wherein the upper row sources include a plurality of light sources that are arranged from an inboard position to an outboard position.

16. The vehicle lamp of claim 15, further comprising:
a steering wheel position sensor, wherein the upper row or lower row light sources progressively illuminate from the inboard position to the outboard position as a magnitude of rotation of a steering wheel, as measured by the steering wheel position sensor, increases.

17. The vehicle lamp of claim 14, further comprising:
a luminescent structure operably coupled with the upper row light sources and configured to luminesce in response to receiving excitation light.

18. The vehicle lamp of claim 17, wherein the luminescent structure comprises at least one luminescent material configured to convert an excitation light received from at least a portion of a light source into a visible light.

* * * * *

UNITED STATES PATENT AND TRADEMARK OFFICE
CERTIFICATE OF CORRECTION

| | | |
|---|---|---|
| PATENT NO. | : 9,896,023 B1 | Page 1 of 1 |
| APPLICATION NO. | : 15/428569 | |
| DATED | : February 20, 2018 | |
| INVENTOR(S) | : Salter et al. | |

It is certified that error appears in the above-identified patent and that said Letters Patent is hereby corrected as shown below:

In the Claims

Column 15:
Claim 14, Line 17;
After "lower" insert --row--.

Column 16:
Claim 15, Line 1;
After "row" insert --light--.

Signed and Sealed this
Twenty-second Day of May, 2018

Andrei Iancu
*Director of the United States Patent and Trademark Office*